United States Patent [19]

Melhose

[11] 3,891,799

[45] June 24, 1975

[54] CODING DEVICE WITH LIGHT RESPONSIVE KEY GENERATOR

[75] Inventor: Alfred E. Melhose, Westfield, N.J.

[73] Assignee: Bell Telephone Laboratories, Incorporated, Murray Hill, N.J.

[22] Filed: Sept. 27, 1944

[21] Appl. No.: 555,912

[52] U.S. Cl. .......................... 178/22; 35/4; 340/357
[51] Int. Cl. .............................................. H04l 9/02
[58] Field of Search ............ 250/220; 84/1.18, 1.28; 35/2, 4; 178/22; 340/357, 364

[56] References Cited
UNITED STATES PATENTS

| | | | |
|---|---|---|---|
| 2,097,392 | 10/1937 | Finch ................................. | 340/364 |
| 2,142,391 | 1/1939 | Fuschi................................ | 84/1.18 |
| 2,169,842 | 8/1939 | Kannenberg....................... | 250/220 |
| 2,223,489 | 12/1940 | Kucher .............................. | 84/1.18 |
| 2,254,022 | 8/1941 | Whitaker............................ | 250/41.5 |
| 2,268,133 | 12/1941 | Carlson.............................. | 250/41.5 |
| 2,425,006 | 8/1947 | Rosen ................................ | 35/4 |
| 2,469,850 | 5/1949 | Spielman ........................... | 84/1.18 |

*Primary Examiner*—Maynard R. Wilbur
*Assistant Examiner*—Howard A. Birmiel
*Attorney, Agent, or Firm*—H. A. Burgess

EXEMPLARY CLAIM

2. In a code pulse generating system, a plurality of rotatable opaque members, circular rows of holes through said members, said rows being concentric with the axis of rotation in the case of each member, means to project light through said holes as they pass a given point in the rotation of the member, means to translate the light transmitted through said holes into electrical pulses, said holes in each row occurring only at points uniformly distributed around the row, the number of such points varying from member to member and being prime to one another, means to rotate each member with a slightly different rotational period from the others, the angular spacing between said points in the case of all members being proportional to the speed of rotation to cause the pulses that are generated under control of different members to coincide in time, said holes differing in effective aperture in an irregular order from point to point along the row of holes in each member so that sequences of electrical pulses varying individually in magnitude are produced depending upon the effective hole aperture, and means to maximize the length of the code cycle between repetitions comprising means to combine the pulses generated under control of the different members for common usage.

4 Claims, 14 Drawing Figures

INVENTOR
A. E. MELHOSE
BY
H. A. Burgess

PATENTED JUN 24 1975
SHEET 2
3,891,799

INVENTOR
A. E. MELHOSE
BY H. A. Burgess 3,891,799

CODING DEVICE WITH LIGHT RESPONSIVE KEY GENERATOR

The present invention relates to a current pulse producing system which is applicable, for example, to systems requiring a supply of code pulses or key pulses as in the case of secrecy systems of transmission.

The general object of the invention is to produce long series of pulses varying in time from pulse to pulse in a practically random or wholly fortuitous manner.

A related object is to accomplish this general object by use of compact equipment capable, if desired, of use on moving vehicles of various types.

In the specific embodiment of the invention disclosed herein, contact difficulties in make and break circuits for producing the pulses are avoided by use of shutters for interrupting light beams incident upon photoelectric cells. In one form the current pulses produced are quantized by varying the effective aperture presented to the light beam in successive times. In another form, the current pulses immediately produced from the light pulses are merely "off" and "on" pulses, that is, pulses all of one amplitude (single-valued pulses) separated by spaces, and the quantizing is accomplished by applying the pulses from a plurality of pulse producers to a common output and variously weighting the pulses from the different pulse producers.

The invention provides for a very long and practically endless series of pulses without repetition by combining shorter series of pulses in different ways, as will be brought out in the description.

In one form the invention economizes on apparatus required in a two-way system, for example, or whenever it is desired to produce two separate sets or trains of pulses, by using common shutter or beam intercepting elements to produce simultaneously two sets or trains of light pulses which are then converted to current pulses.

The invention provides for rapid changes to be made in the settings or adjustments of the apparatus from time to time as desired in order to change the sequence of the generated pulses, or the code.

These and other objects and features of the invention as well as the manner of construction and use will appear more fully from the following detailed description of embodiments illustrated in the accompanying drawings in which:

Figure 1:
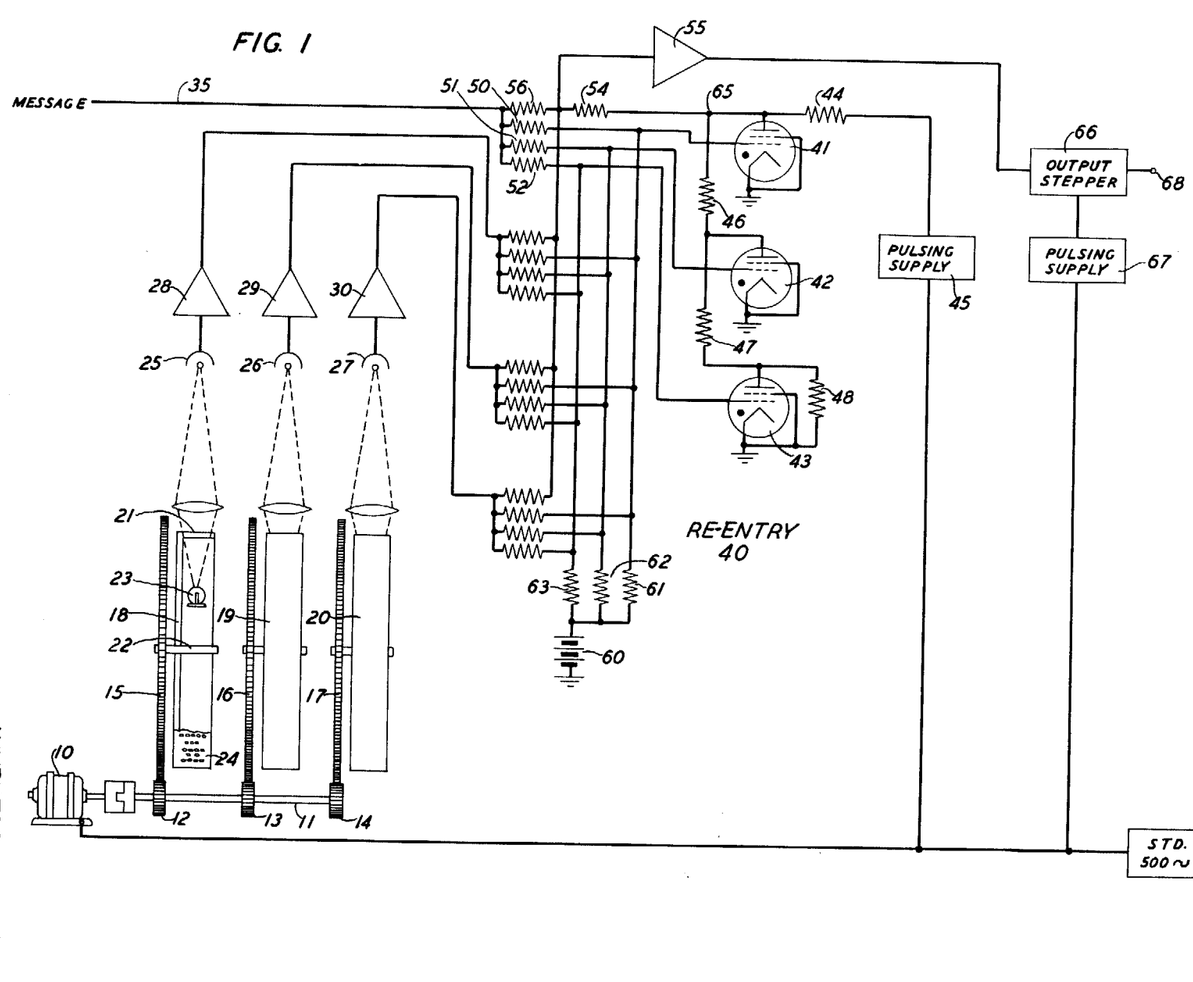
FIG. 1 is a schematic circuit diagram showing one form which the invention may take as a key or code pulse producing system.

Referring to FIG. 1, a motor 10 driven at a constant speed drives shaft 11 on which are three pinions 12, 13 and 14 meshing with gears 15, 16 and 17, respectively. Each gear has a stub shaft 22 (bearings not shown) for enabling the gear to drive a disc 18, 19 or 20. Considering disc 18, the rim of the disc is spun over at 21 or otherwise constructed to form a flange so that disc 18 and flange 21 form a hollow drum. The flange part 21 has horizontal rows of perforations, shown at 24, each row of such holes varying in number from zero to five in a fortuitous manner. The other discs or drums are similarly constructed. A light source 23 is arranged inside each drum with a suitable illuminating arrangement for casting a wide thin beam of such cross-section as to cover one row of holes at one point in the rotation of the disc or drum. The amount of light passing through one row of holes is, therefore, directly proportional to the number of holes in the row and as stated this varies from zero to five, the zero meaning a blank or entire absence of perforations. While the rate of pulses produced may be anything within wide limits, it will be assumed by way of example that it is desired to produce pulses at the rate of 500 per second with a very long cycle before repetition occurs. The central drum 19 may, therefore, contain 500 rows of perforations counting those regular positions in which holes might occur but do not occur. The motor 10 and gearing 13 and 16 drive drum 19 at the rate of 1 revolution per second thus producing 500 light pulses. Gearing 12 and 15 may then be arranged to drive disc 18 slightly faster and gearing 14 and 17 to drive disc 20 slightly slower. If there are 499 rows of holes in flange or drum 21, for example, (counting spaces) and 501 rows in drum 20, drum 21 is to be driven at such a speed as to produce 500 light pulses per second or 1 complete revolution plus 1 row of holes in 1 second. Drum 20, in order to produce 500 light pulses, is driven 1 complete revolution minus 1 row of holes in 1 second.

The light beams from the three drums are focused by suitable optical systems upon the anodes of three photoelectric cells 25, 26 and 27 leading to amplifiers 28, 29 and 30. These photoelectric cells and amplifiers convert the light pulses into electric current pulses and it will be assumed by way of example that a zero value of light pulse produces a zero output value of current from the amplifiers whereas a 5-unit light pulse produces an output current of minus 60 units from the amplifiers, each step, therefore, corresponding to minus 12 units of current.

The manner in which these pulses may be used to encipher a message is, in general, similar to that disclosed in the application of R. L. Miller Ser. No. 542,975, filed June 30, 1944 except that the message currents coming in on input circuit 35 to the reentry circuit 40 is combined simultaneously with the three keys derived from amplifiers 28, 29 and 30 instead of with one key. This requires a multiple reentry circuit as will presently be described.

The message currents may consist of pulses occurring at the rate of 500 per second and varying in amplitude in five steps from zero to five, each step also comprising minus 12 units of current measured from some reference value corresponding to zero message current. (These values may be obtained directly from a gas tube stepping circuit of the type shown in the Miller application, using the proper poling. The increasingly minus steps from the amplifiers 28, 29 and 30 may be obtained by using a proper number of stages in each case together with a proper poling of the output circuits.) The reentry circuit 40 comprises 3 gas-filled tubes 41, 42 and 43 the plate circuits of which are connected through common resistor 44 to a pulsing supply 45 which applies positive voltage to the anodes of these tubes in pulses at the rate of 500 per second. Connected between the anodes of tubes 41 and 42 is a resistor 46 and connected between the anodes of tubes 43 and 44 is a resistor 47. Resistor 48 is connected around the anode-cathode circuit of tube 43. The pulsing supply circuit 45 may be of the same type as shown in FIG. 6 of the Miller application cited.

The message circuit 35 is connected through individual high resistors 50, 51 and 52 to the grids of tubes 41, 42 and 43, respectively. The anode of tube 41 is connected through a resistor 54 to the input side of output amplifier 55 while the message circuit 35 is connected to the same point through a resistor 56. This same arrangement is carried out in connecting the outputs of the amplifiers 28, 29 and 30 to the grids of tubes 41, 42 and 43 and to the input terminal of amplifier 55.

A positive voltage is supplied from bias battery 60 through three different sized resistors 61, 62 and 63 to the grids of tubes 41, 42 and 43, respectively. These three resistors are proportioned in respect to the other resistors connected to the grids of the tubes 41, 42 and 43 to act like a potentiometer network for applying different bias potentials to the grids of the reentry tubes. The resistances 50, 51 and 52, etc., and also 61, 62 and 63, are of sufficiently large value to permit the direct addition of voltages supplied through them to the points to which they are connected in common.

The operation of the reentry circuit will now be described. It is desired whenever six to eleven steps of voltage are applied to the input of amplifier 55 to arrange the circuit to subtract six steps of voltage, thus reducing the value of the input pulse to the range zero to five steps. Moreover, the range of steps to be applied to the input of amplifier 55 is to be confined in all cases to zero to five steps. Since the maximum value of the message is five steps and each of the three keys has a maximum of five steps, their addition can give a combined total varying over the range zero to twenty steps. The reentry circuit must, therefore, be arranged to produce a reentered voltage at steps 6, 12 and 18, to subtract 6, 12 and 18 steps in the three respective cases. The three tubes 41, 42 and 43 are all fired whenever the total combined input from the message and key circuits is less than six steps. Under these conditions, the voltage at the junction point 65 has its smallest value because maximum current is being drawn through the series resistor 44. This voltage at junction point 65 is such as to subtract from the voltage applied to the input of amplifier 55 from the message and key circuits a fixed amount which sets the zero value of input of applied signal. When the combined voltage of the message and key circuits or either of them lies between steps 6 and 11, these steps being negative, the bias voltage applied to the grid of tube 41 is too low to allow that tube to fire, this tube having the smallest positive bias. Under these conditions a smaller amount of current is drawn through resistor 44 and the voltage at the junction point 65 is raised by six steps, thus canceling six of the negative steps applied from the message and key circuits to the input of amplifier 55. When the combined input of the message and key amounts to any value from step 12 to step 17, the bias on the grid of tube 42 also becomes too low to permit that tube to fire, thus drawing less current through resistors 44 and 46 and the voltage at junction point 65 is 12 steps more positive than normal, thus subtracting twelve steps from the message and key input to amplifier 55. In a similar manner for message and key inputs amounting to anything in excess of 18 steps tube 43 also fails to fire and the resistors 44, 46, 47 and 48 then act as a potentiometer to apply such a voltage at point 65 as to neutralize eighteen steps in the message and key input to amplifier 55.

The output of amplifier 55 is shown feeding into output stepper 66 supplied with pulsing supply 67 as in the Miller application. The output terminal 68 may lead to one of a number of multiplex transmission channels, one for each enciphered message of the complete system.

By combining several codes of slightly different length as has been described in connection with FIG. 1, the period of repetition of the code generating machine is greatly extended. For example, for the figures assumed in FIG. 1 the effective length of the code is 499 × 500 × 501 or 127, 999, 537 pulses since the three numbers have no common denominator. Since the code is assumed to be transmitted at the rate of 500 pulses per second, this length of code will last for about 70 hours before it starts to repeat. It will be obvious from the structure in FIG. 1 to provide additional discs or drums for still further lengthening the code cycle. Each added drum multiplies the length of the cycle by a large number, of the order of 500 in the example assumed.

Figure 2:
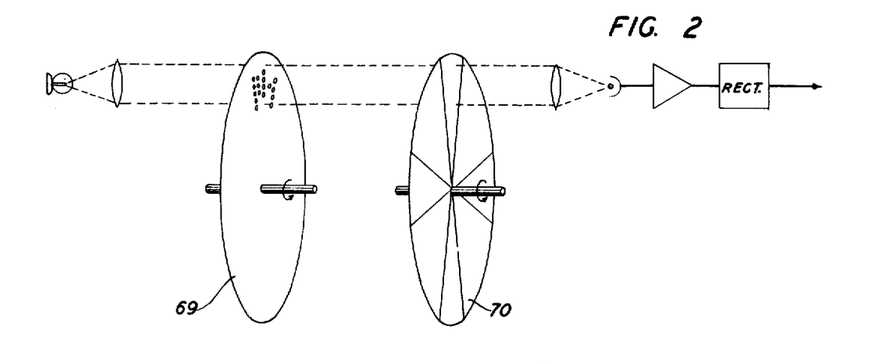
FIG. 2 is a skeleton view in part perspective of a modification in the light interrupter mechanism of FIG. 1.

In FIG. 1 the output of the photoelectric cells is at varying direct current. To avoid the problem of amplifying such a signal it may be converted to an alternating current signal by interposing in the path of the light a shutter which interrupts the beam of light at a high speed as is shown in FIG. 2, the shutter being indicated at 70 and the code disc at 69. In this case the holes are shown perforated along radial lines in the disc 69 instead of in a flange at the periphery of the disc or drum.

Figure 3:
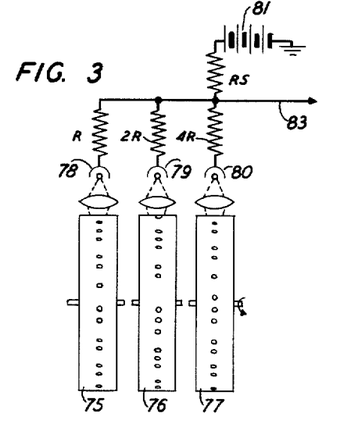
FIG. 3 is a partial diagrammatic view of a system using single-valued pulses.

FIG. 3 illustrates the use of single-valued pulses or off and on pulses combined with an electrical weighting circuit for converting them to multivalued pulses. The three drums shown at 75, 76 and 77 (which could obviously be discs) are arranged to be driven at slightly different speeds as in FIG. 1. Each drum or disc contains a single row of holes with some blanks to provide zero value pulses, the holes and blanks being arranged in a fortuitous manner different in the case of each disc or drum. The rate of rotation and spacing of holes is such as to produce light pulses in unison and at the same rate on the three photoelectric cells 78, 79 and 80. These photoelectric cells are supplied with a bias voltage from battery 81 through a network of resistances including common resistor RS and individual resistors R, 2R and 4R as shown. This causes photoelectric cell 78 to produce in the common output circuit 83, pulses of zero or four steps; photoelectric cell 79 to produce pulses of zero or two steps and photoelectric cell 80 to produce pulses of either zero or one-step value. By leading these pulses from 83 into a reentry circuit, reentering at step 6 a zero to five-step key is obtained.

Figure 5:
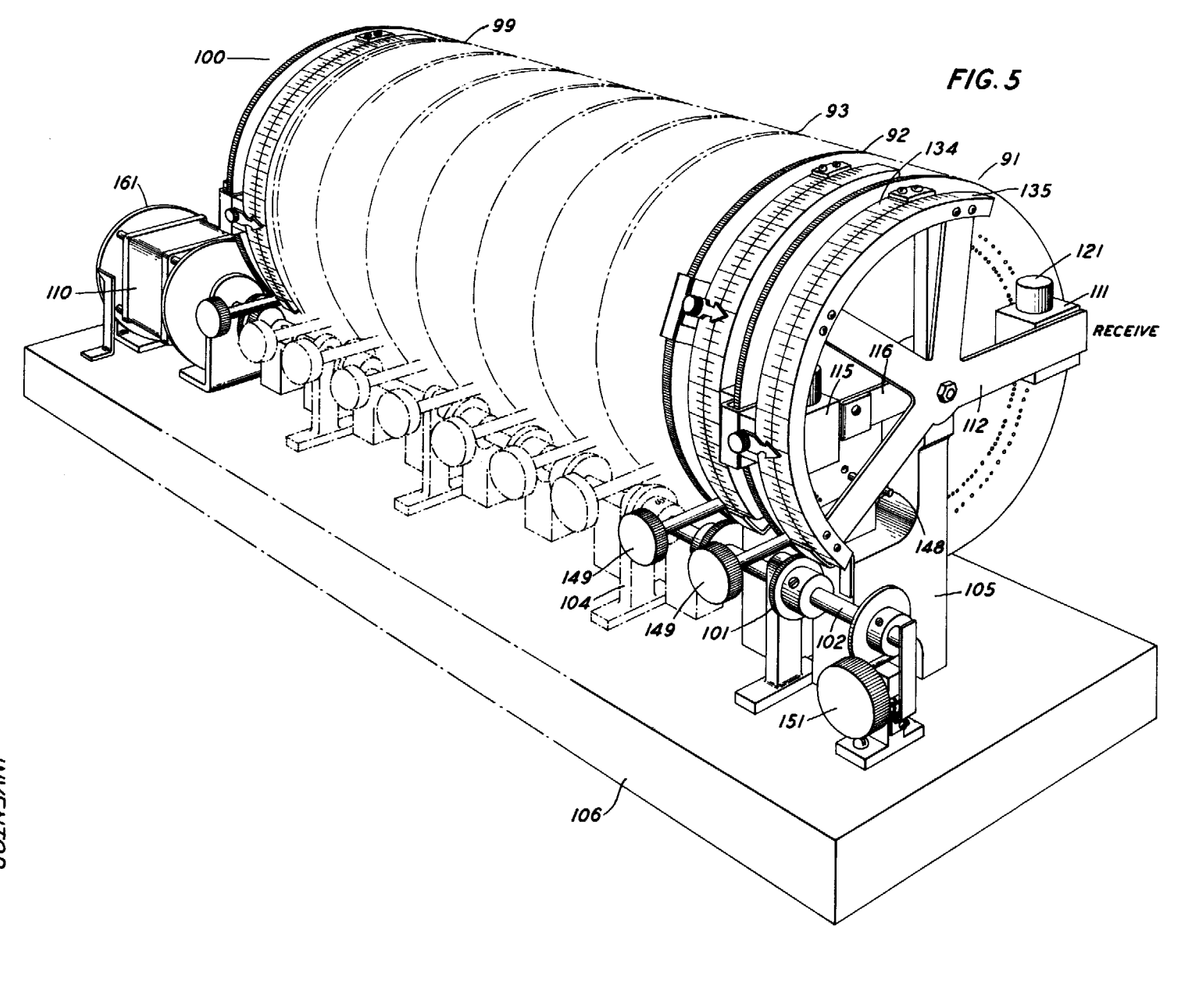
FIG. 5 is a perspective view of an apparatus or machine in accordance with one form of the invention using in this specific instance nine code discs and a synchronizing disc.

The machine shown in FIG. 5 comprises 10 discs 91 to 100. Discs 91 to 99, inclusive, are coding or key producing discs while disc 100 is used for generating a current of 500 pulses per second for synchronizing purposes, this disc containing a continuous series of perforations with no blank spaces in any of the hole positions. It will be understood that discs 91 to 99 contain holes or perforations varying in number from disc to disc and arrangement in a fortuitous manner so that as a disc rotates past the light source the light pulses occur in irregular sequence. An indication of how the holes might be arranged is given in connection with disc 91 of FIG. 5 and FIG. 6.

Each disc has gear teeth cut on its periphery and is mounted to mesh with a corresponding driving pinion 101 of which there are ten mounted on driving shaft 102 which is driven at constant speed by synchronous motor 110. Bearings for shaft 102 are provided on posts 104. The discs 91 to 99 are of slightly different diameter and are driven at slightly different angular speeds and if there were no blanks present in the circular row of holes the maximum number of holes would vary from disc to disc. These numbers might, for example, be for the nine discs 91 to 99 as follows: 263, 259, 257, 253, 251, 249, 247, 241 and 239. These numbers have no common denominator. As described in connection with FIG. 1, the spacing between the holes is related to the rotational speed of each disc to provide pulses at the rate of 500 per second, counting zeros as pulses in giving this rate. The discs are mounted to rotate on stub shafts individually supported on standards or pedestals 105 (FIGS. 5, 6, 10 and 11).

Figures 6, 7, 8, 9:
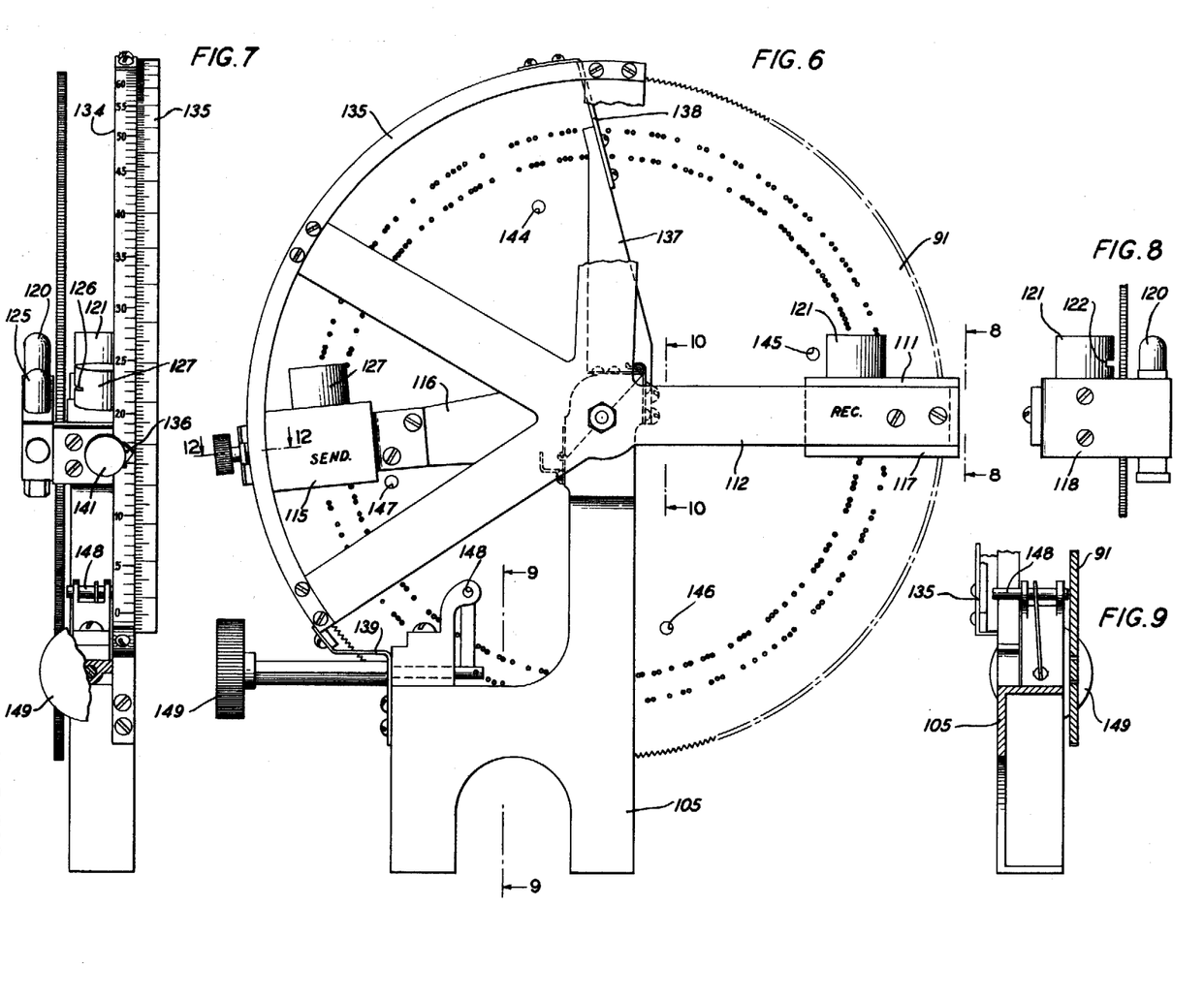
FIG. 6 is an elevation, looking along the axis of the machine, of one of the discs of the FIG. 5 machine together with its supporting standard and transmitting and receiving photocell equipments and their mountings.
FIG. 7 is a side elevation of the FIG. 6 construction as seen from the left.
FIG. 8 is a detail side view in elevation of the lamp and the photoelectric cell housing as seen looking to the left at line 8—8 of FIG. 6.
FIG. 9 is a detail view partly in section of the positioning pin and its operating mechanism looking to the left at line 9—9 of FIG. 6.

In order to adapt one machine for use in generating two different codes one of which may be used, for example, in transmitting and another in receiving, each of the nine code discs is provided with two circular rows of holes. The inner row of holes as shown in FIGS. 5 and 6 is provided with a photoelectric cell contained in housing 121 mounted on a support which is generally indicated in FIG. 5 at 111, which is carried on one arm of a spider 112 mounted for rotation about the same center as stub shaft 113. A second photoelectric cell assembly 115 is mounted on a radial arm 116 independently rotatable about the same center. The photoelectric cell mounting 111 has a bracket 117, 118 which reaches around the edge of the disc and supports the lamp 20 on the opposite side of the row of holes from the photoelectric cell housing 121. It is found for the small distances involved that no optical focusing arrangement is required. The holes in the disc act as a shutter for interrupting light from the lamp 120 which is incident upon the slit 122 in the housing 121 (FIG. 8). A similar arrangement is used for the photoelectric cell mounting 115, lamp 125 illuminating the cell in this case through slit 126 in housing 127.

Figure 10:
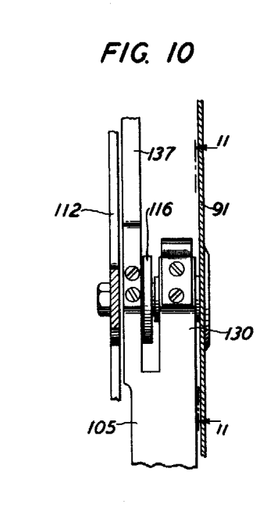
FIG. 10 is a side detail view in part section of the stub shaft bearing for the disc and cell housing spiders as seen looking to the left at line 10—10 of FIG. 6.
Figure 11:
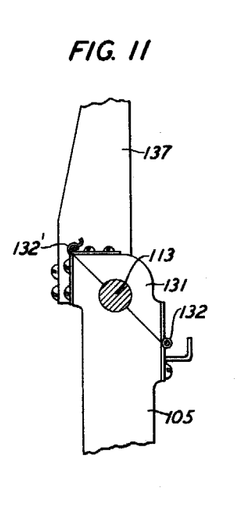
FIG. 11 is a front view of the construction of FIG. 10.

Flexible shielded leads (not shown) are brought out from the lamps and cells for connection to desired circuits. The pedestal 105 is bifurcated at its upper end as shown in FIG. 10. The right-hand branch 130 in this figure contains the bearing for the stub shaft 113 which carries the disc 91. This stub shaft has end flanges fitting over both sides of the standard 130 to prevent endplay. The shaft is made of a composition which provides self lubrication. The support 130 is cut on a line radial from the center of the pinion shaft 102 through the center of the shaft 113 as shown in FIG. 11 and one portion 131 is mounted on a hinge 132 to permit opening the bearing for insertion and removal of a disc together with its shaft. The bearing is held closed by spring detent 132'. The left-hand branch of the pedestal as seen in FIG. 10 is drilled concentric with the shaft 113 and supports on a bolt passing through this hole the spider member 112 and the arm 116.

Figure 12:
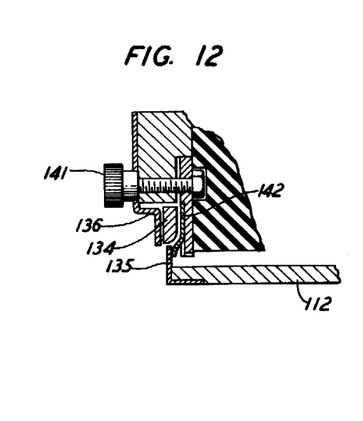
FIG. 12 is a section along line 12—12 of FIG. 6 of the spider and scale clamping screw mechanism.

Means are provided for readily varying the relative scanning positions of each disc, thereby changing the code, by the use of graduated semicircular scales 134 and 135 and index point 136 which indicates the position of the scanning units. The sending code scale 134 is fixed to the supporting frame by bracket 137 secured to the pedestal 105 and also by the cooperating straps 138 and 139. The sending scanning unit 126 is mounted under the fixed scale 134 but is free to move over an arc of slightly more than 90° corresponding to 63 scale divisions. The receiving scanning unit 111 scans the code holes on the opposite side of the disc and the receiving scale 135 is brought forward on three arms of the spider 112 so that the sending and receiving scales are adjacent as shown in FIG. 7 and the graduations are indexed from the common pointer 136. The receiving scale moves over an arc of 144° marked in 200 scale divisions. The 200 divisions correspond to 200 milliseconds of disc rotation time. Thus, a circuit and transmission loop delay up to 200 milliseconds can be compressed. After the scanning units have been adjusted to the desired angular position they are locked together by means of the clamping screw 141 which (referring to FIG. 12), when tightened, clamps the index pointer 136 against the sending scale 134 and clamps a member 142 against the receiving scale 135, locking the scales and the scanning units in fixed position.

Figure 13:
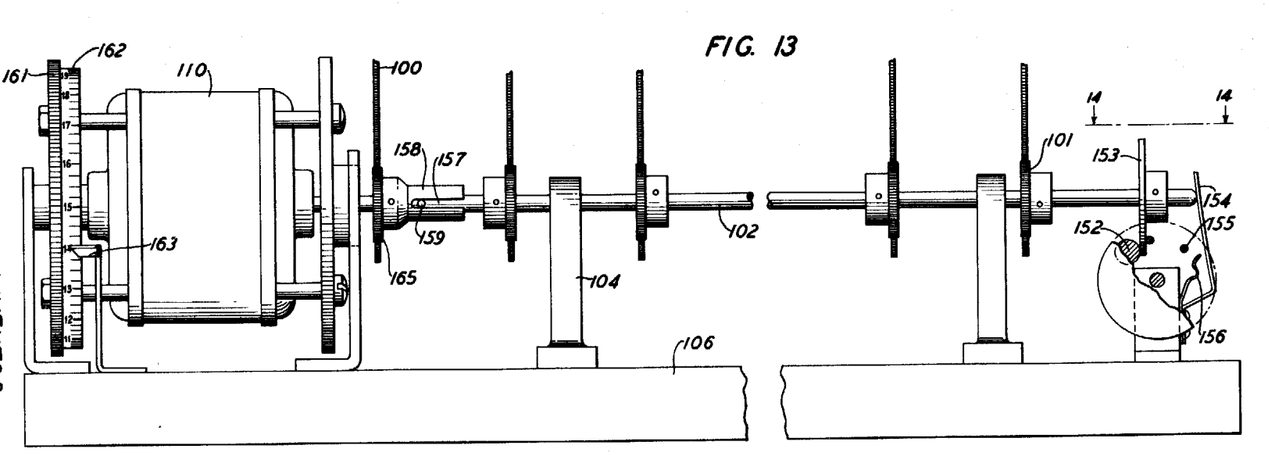
FIG. 13 is a view in elevation of the driving motor and pinion shaft seen also in perspective in FIG. 5.
Figure 14:
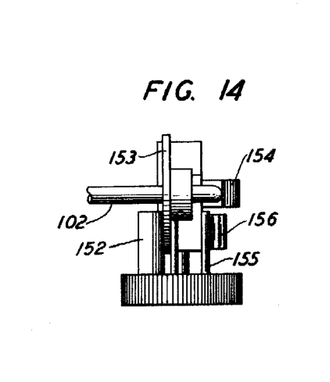
FIG. 14 is a plan view of the disengaging screw as seen from line 14—14 of FIG. 13.

Each code disc is provided with four quadrant holes shown in FIG. 6 at 144, 145, 146 and 147 and with an individual pin 148 which can be operated by means of knurled head 149 to engage or disengage one of these four holes during a period of readjustment of the discs in setting up a new code. That is, it is contemplated that from time to time the code discs will be moved relative to each other by one or more quadrants of a revolution in order to use different parts of the row of scanning holes in the different discs at different times relative to each other. The procedure to be followed in readjusting the nine code discs in this manner is to disengage the driving motor from all of the discs 91 to 99 so that each disc can be freely moved by hand. This is done by turning the knurled head 151 to the right in FIG. 5, bringing the pin 152 (FIGS. 13 and 14) against the disc 153 and forcing the shaft 102 toward the right against the tension of spring 154 until pin 155 engages detent spring 156 and locks the shaft 102 in its extreme right-hand position. Endwise movement of shaft 102 is provided by the spline 157 in shaft coupling collar 158 and cooperating pin 159. In this position of the shaft 102 all of the driving pinions 101 are disengaged from the discs 91 to 99 so that each disc can be freely moved by hand. When a disc is moved to the position which it is to assume, it is locked in this position by means of the quadrant holes and pins 148. After all of the discs have been adjusted to the desired relative positions all of the knurled heads 149 are moved to the right in FIG. 5 to withdraw the holding pins 148 after which the knurled head 151 is moved to the left to reengage the pinions 101 with the discs. It will be noted that movement of the shaft 102 to disengage the driving pinions from the code discs 91 to 99 does not disengage the driving pinion 165 from the synchronizing disc 100 since as shown in FIG. 13 pinion 165 is mounted on the part of the motor drive shaft which is not adjustable endwise.

As a means of adjusting the relative phase of the driving motors 110 in different machines the motor mounting is arranged to permit the motor casing to be rotated about the axis of the driving shaft by means of the knurled collar 161. A scale 162 and index 163 are provided to indicate the angular position. The motor can be held in any angular position by friction means not shown.

Figure 4:
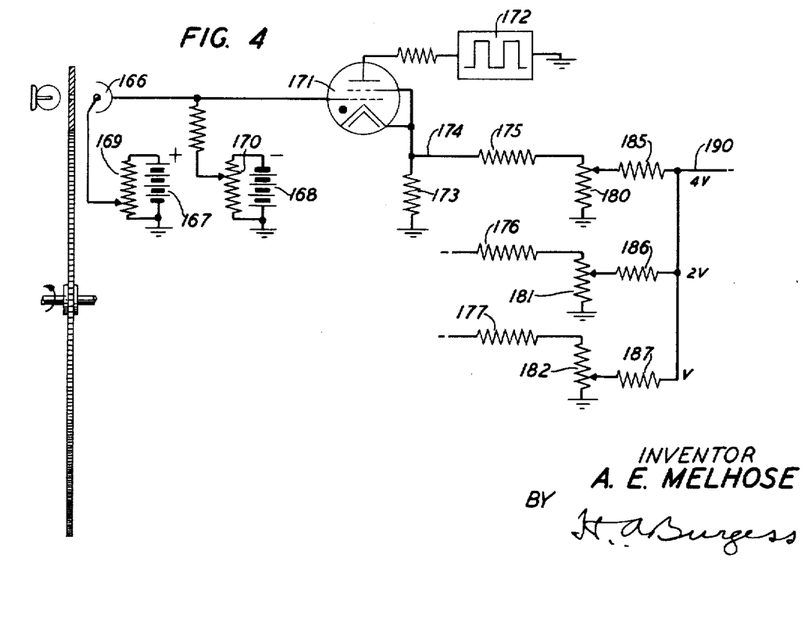
FIG. 4 is a detail diagram of the circuit for translating light pulses to electrical current pulses including a view partly in section of a disc shutter of the type used in the FIG. 5 construction.

FIG. 4 shows the details of the photoelectric cell circuit used in the case of all code discs. The photoelectric cell 166 is supplied with polarizing batteries 167 and 168 and potentiometers 169 and 170, the cathode of the cell being connected directly to the control grid of a gas-filled tube 171. A pulsing plate voltage is provided in the form of 500-cycle pulses from a suitable source diagrammatically indicated at 172 connected between ground and the anode of tube 171. The load is taken off from a resistor 173 connected between the cathode and ground. With this scheme of connections positive pulses are applied to the load conductor 174 whenever a hole appears opposite the scanning cell and at all other times ground is applied to conductor 174. If negative instead of positive pulses are desired, a phase reversing tube may be used between conductor 174 and the load. The source of pulsing power supply 172 may be of the same type as indicated above in connection with the supplies 45 and 67 of FIG. 1.

Different types of circuits can be used for taking off and combining the pulses generated by the different discs. The method shown in FIG. 4 is similar to that in FIG. 3 for three of the nine discs. The pulses from the individual tube coupling resistors 173 are connected through high series resistors 175, 176 and 177 to three voltage dividers 180, 181 and 182 from which different voltages in the ratio of V, 2V and 4V are taken off through the three high series resistors 185, 186 and 187. These voltages are added and applied to common ouput terminal 190.

The discs may be arranged in three sets of three with each set connected as in FIG. 4 to three output terminals like 190. These three terminals 190 may then be connected to a multiple reentry circuit like that of FIG. 1 either together with the message or without the message.

What is claimed is:

1. In a code pulse generating system, a plurality of rotatable opaque members, circular rows of holes through said members, said rows being concentric with the axis of rotation in the case of each member, means to project light through said holes as they pass a given point in the rotation of the member, means to translate the light transmitted through said holes into electrical pulses, said holes in each row having a non-uniform distribution around the row, the spacing between any two adjacent holes being either equal to, or an integral multiple of, the smallest spacing between adjacent holes, such spacing and number of such points differing slightly among the different members, means to rotate each member with a slightly different rotational period from the others, the smallest angular spacing between adjacent holes in the case of all members being proportional to the speed of rotation to cause the pulses that are generated under control of different members to coincide in time, and means to maximize the length of the code cycle between repetitions comprising means to combine the pulses generated under control of the different members into a continuous sequence of pulses, interspersed with spaces in highly irregular order.

2. In a code pulse generating system, a plurality of rotatable opaque members, circular rows of holes through said members, said rows being concentric with the axis of rotation in the case of each member, means to project light through said holes as they pass a given point in the rotation of the member, means to translate the light transmitted through said holes into electrical pulses, said holes in each row occurring only at points uniformly distributed around the row, the number of such points varying from member to member and being prime to one another, means to rotate each member with a slightly different rotational period from the others, the angular spacing between said points in the case of all members being proportional to the speed of rotation to cause the pulses that are generated under control of different members to coincide in time, said holes differing in effective aperture in an irregular order from point to point along the row of holes in each member so that sequences of electrical pulses varying individually in magnitude are produced depending upon the effective hole aperture, and means to maximize the length of the code cycle between repetitions comprising means to combine the pulses generated under control of the different members for common usage.

3. In a code pulse generating system, a plurality of rotatable opaque members, circular rows of holes through said members, said rows being concentric with the axis of rotation in the case of each member, means to project light through said holes as they pass a given point in the rotation of the member, means to translate the light transmitted through said holes into electrical pulses, said holes in each row having a non-uniform distribution around the row, the spacing between any two adjacent holes being either equal to, or an integral multiple of, the smallest spacing between adjacent holes, such spacing and distribution differing among the different members, means to rotate each member with a slightly different rotational period from the others, the smallest angular spacing between adjacent holes in the case of all members being proportional to the speed of rotation to cause the pulses that are generated under control of different members to coincide in time, and means to maximize the length of the code cycle between repetitions comprising means to combine the pulses generated under control of the different members for common usage, including means mounting said light projecting means and said translating means in fixed position relative to each other in the case of each member and on opposite sides of the member, and means permitting adjustment of the angular position of said mounting means about said axis of rotation.

4. In a code pulse generating system, a plurality of rotatable opaque members, circular rows of holes through said members, said rows being concentric with the axis of rotation in the case of each member, means to project light through said holes as they pass a given point in the rotation of the member, means to translate the light transmitted through said holes into electrical pulses, said holes in each row having a non-uniform distribution around the row, the spacing between any two adjacent holes being either equal to, or an integral multiple of, the smallest spacing between adjacent holes, such spacing and distribution differing among the different members, means to rotate each member with a slightly different rotational period from the others, the smallest angular spacing between adjacent holes in the case of all members being proportional to the speed of rotation to cause the pulses that are generated under control of different members to coincide in time, and means to maximize the length of the code cycle between repetitions comprising means to combine the pulses generated under control of the different members for common usage, in which each member contains one row of holes of uniform effective aperture and individual means in circuit with the translating means of the several members for differently weighting the electrical pulses generated under control of the different members.

* * * * *